Oct. 7, 1924.

T. H. MATHESON 1,511,133

SPRING WHEEL

Filed Jan. 8, 1923

Oct. 7, 1924.
T. H. MATHESON
SPRING WHEEL
Filed Jan. 8, 1923
1,511,133
2 Sheets-Sheet 2
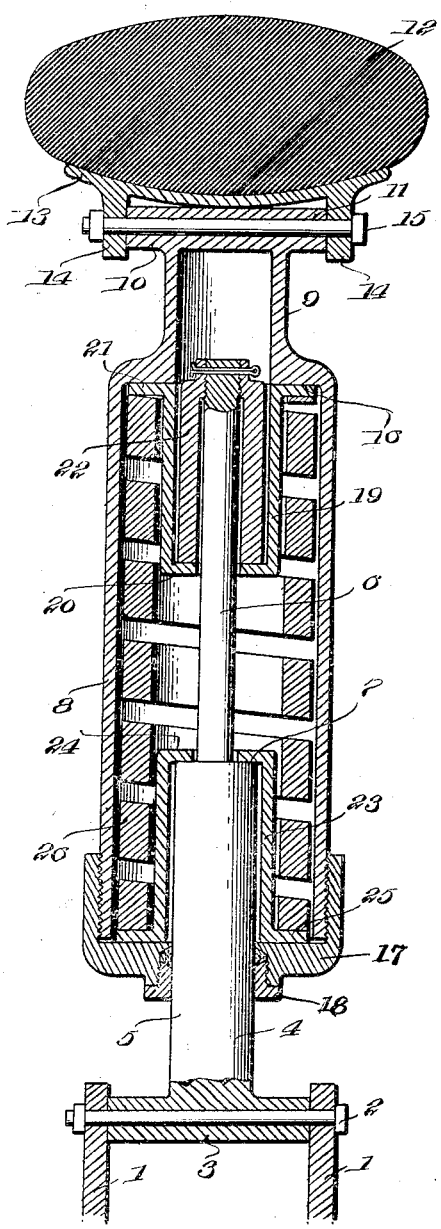
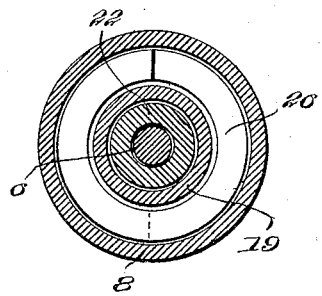
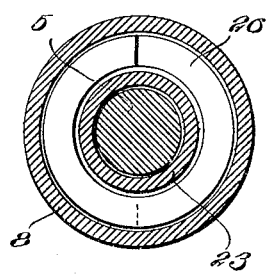
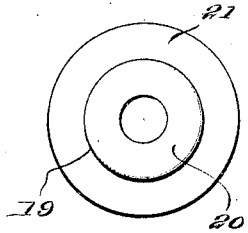
T. H. Matheson
INVENTOR
BY Victor J. Evans
ATTORNEY
WITNESS:

Patented Oct. 7, 1924.

1,511,133

UNITED STATES PATENT OFFICE.

THORVALD H. MATHESON, OF CASPER, WYOMING.

SPRING WHEEL.

Application filed January 8, 1923. Serial No. 611,361.

*To all whom it may concern:*

Be it known that I, THORVALD H. MATHESON, a citizen of Norway, residing at Casper, in the county of Natrona and State of Wyoming, have invented new and useful Improvements in Spring Wheels, of which the following is a specification.

The object of this invention is to produce a vehicle wheel of a construction by which shocks and jars to which the wheel is subjected will be effectively absorbed.

A further object is to produce a vehicle wheel having telescopically related spring influenced spoke sections associated and connected in a manner whereby shocks and jars delivered on the tread of the wheel will be absorbed by the spokes thereof.

To the attainment of the foregoing and other objects which will present themselves as the nature of the invention is better understood, reference is to be had to the drawings which accompany and which form part of this application.

In the drawings:—

Figure 2 is a greatly enlarged sectional view on the line 2—2 of Figure 1.

Figure 3 is a sectional view on the line 3—3 of Figure 1, also on an enlarged scale.

Figure 4 is a similar sectional view on the line 4—4 of Figure 1.

Figure 5 is an end view of the member 19 shown in Fig. 2.

Figure 1:
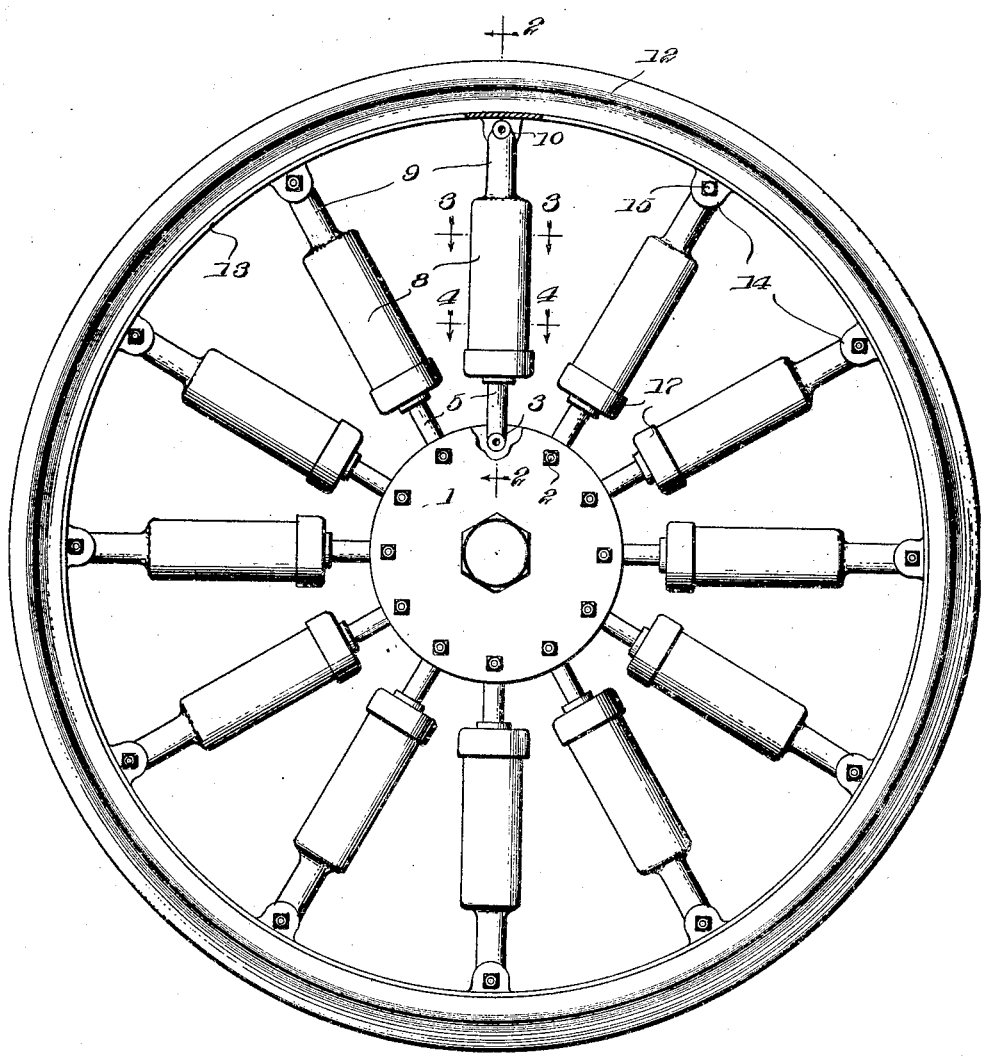
Figure 1 is a side elevation of a vehicle wheel in accordance with this invention.

The hub of my improved vehicle wheel includes two spaced disks 1 having central openings that receive therethrough and have secured therein the boxing in which the axle spindle is journaled. The disks, adjacent to their outer peripheries are provided with circumferentially arranged equi-distantly spaced openings that align, and through these openings there are passed bolts 2 engaged by the usual nuts. Each bolt 2 passes through a bearing opening in the widened inner end 3 of the inner sections of the spokes of the improvement. Each of said sections, indicated by the numeral 4, includes a spindle-like body 5 having a reduced extension 6 at its outer end, the ends of the said extension being preferably threaded. For distinction, the shoulder provided between each spindle 5 and its extension 6 is indicated, in the drawings, by the numeral 7.

The outer spoke sections each comprise a tubular member 8 having, adjacent its outer end, a reduced extension or neck 9, the latter being widened at its outer end, as at 10 and provided with a transverse opening 11.

The tire 12 for the wheel may be solid, and is received in a rim 13 having its inner face provided with depending lugs 14, and passing through these aligning lugs and through the opening 11 in each of the outer spoke sections, is a bolt 15, engaged by a suitable nut.

For distinction, the shoulder between the tubular spoke section 8 and its neck portion 9 is indicated, in the drawings, by the numeral 16. The inner end of each of the members 8 is threaded, and there is arranged around the spindle extension of the inner spoke section 8 a cap nut 17 which is screwed on the said threaded end of the spoke section 8. Each cap nut 17 has on its outer face a pocket for a packing, and closing each pocket there is a packing nut 18.

Loosely arranged on the extension 6 of each of the inner spoke sections 4 there is a tubular member 19 having its inner end flanged inwardly, as at 20 and its outer end flanged outwardly, as at 21. In the bore of the tubular member 19, surrounding the extension 6 of the inner spoke members 4 and secured to said extension there is a collar 22.

Surrounding the spindle portion 5 of each spoke section 4, and received in the outer section 8 thereof, there is a tubular member 23 of a similar construction to the tubular member 19. The tubular members 23 have their outer ends flanged inwardly, as at 24, the extension 6 of the said spoke sections passing through central openings in said flanges. Each tubular member has its inner end flanged outwardly, as at 25, and surrounding the tubular members 19 and 23, and having its end convolution resting on the flanges 21 and 25 thereof, there is a helical spring 26 whose convolutions are comparatively wide.

When the spoke sections and the remainder of the wheel are assembled as above set forth, the packing nuts 18 are removed and the interior of the hollow spoke sections are filled with cup grease, the nuts being replaced to prevent leakage of the lubricant between the cap nut 17 and the spindle 5 of the inner spoke sections 4. An inward pressure exerted on any of the spokes will cause the shoulders 16 of the hollow or outer spoke sections 8 to contact with the flanges 21 on the tubular members 19 to compress the springs 26. This compression of the springs will cause the same to move the tubular members 23 until the flanges 24 thereof are brought to contacting engagement with the shoulders 7 on the spindles 5. This does not limit the full inward movement of the outer spoke section on the inner spoke section, as the springs 26 are not fully compressed, but the latter resist and absorb every shock imparted to the spoke. The movement of the sections 8 outward of the sections 4 is limited by contacting engagement of the flanges 8 of the tubular members 19 with the ends of the collars or sleeves 22. Each spoke thus has a double action, and the strain upon one will be absorbed by all of the spokes at the same time.

It is thought that the foregoing description, when taken in connection with the drawings will fully set forth the construction, operation and advantages of the improvement to those skilled in the art to which this invention relates and that further detailed description will not be required. It is also believed necessary to state that I do not desire to be restricted to the precise structural details herein set forth, as in the manufacture of my improved wheel I may find it necessary or desirable to resort to such changes and modifications therefrom as fall within the scope of what I claim, as for instance, the shoulder provided by the collar 22 may be in the nature of a nut or pin projecting beyond the sides of the shank extension 6.

Having described the invention, I claim:—

A vehicle wheel including a hub, a tire carrying rim and spokes pivoted to the hub and to the rim, each of said spokes comprising an inner solid section having its outer end portions reduced to provide a shoulder inwardly of the middle of said section, said solid sections having their outer ends screw threaded, a collar threaded onto the outer end of each of the solid sections and extending inwardly thereof, each of said spokes including a hollow outer section and having its inner end opened to receive the inner solid section, a cap closing the inner end of the outer section and having an opening therethrough to accommodate the solid inner section, the outer end of said outer section being reduced to provide an internal shoulder and a neck portion, hollow members having inwardly directed flanges slidable on the inner solid spoke section between the shoulder thereof and the adjustable collar, each of said hollow members having an outwardly directed flange, a helical spring within said outer hollow section and surrounding the inner spoke section and the hollow members and contacting with the outer flanges thereof to normally force the inner flanges into contact respectively with said collar and the shoulder of the solid section and to force the outer flanges into contact with the inner shoulder of the outer section and with the closure cap thereof, and said neck of the outer section receiving said collar and outer end of the inner section when said coil spring is compressed.

In testimony whereof I affix my signature.

THORVALD H. MATHESON.